US009059979B2

(12) United States Patent
Fresko et al.

(10) Patent No.: US 9,059,979 B2
(45) Date of Patent: Jun. 16, 2015

(54) COOKIE VERIFICATION METHODS AND APPARATUS FOR USE IN PROVIDING APPLICATION SERVICES TO COMMUNICATION DEVICES

(75) Inventors: Nedim Fresko, Redwood City, CA (US); Will D. Franco, Sunrise, FL (US); Alexander Sherkin, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 972 days.

(21) Appl. No.: 12/395,426

(22) Filed: Feb. 27, 2009

(65) Prior Publication Data
US 2010/0223471 A1 Sep. 2, 2010

(51) Int. Cl.
*G06F 7/04* (2006.01)
*H04L 29/06* (2006.01)

(52) U.S. Cl.
CPC ............... *H04L 63/08* (2013.01); *H04L 63/12* (2013.01); *H04L 63/168* (2013.01)

(58) Field of Classification Search
CPC ..... H04L 63/08; H04L 63/0815; H04L 63/18; H04L 9/3213; H04L 29/08621
USPC ............................................................ 726/5
See application file for complete search history.

(56) References Cited

U.S. PATENT DOCUMENTS

| 5,204,902 A | 4/1993 | Reeds, III et al. |
| 6,006,333 A | 12/1999 | Nielsen |
| 6,041,357 A * | 3/2000 | Kunzelman et al. .......... 709/228 |

(Continued)

FOREIGN PATENT DOCUMENTS

| WO | 0205475 A2 | 1/2002 |
| WO | 2007068716 A1 | 6/2007 |

OTHER PUBLICATIONS

RFC 2109, HTTP State Management Mechanism, 1997, Retrieved from the Internet <URL: ietf.org/rfc/rfc2109.txt.pdf>, pp. 1-21 as printed.*
Stavrou et al. A Pay-pe-Use DoS Protection Mechanism for the Web, 2004, Retrieved from the Internet <URL: citeseerx.ist.psu.edu/viewdoc/summary?doi=10.1.1.10.8257>, pp. 1-15 as printed.*

(Continued)

*Primary Examiner* — Michael Chao
(74) *Attorney, Agent, or Firm* — Fish & Richardson P.C.

(57) ABSTRACT

In one illustrative example, a method in a communication device adapted for communications using Hypertext Transport Protocol (HTTP) involves setting, at the communication device, an HTTP cookie which includes a user identification of a user of the communication device and a message portion which is signed with a digital signature of the user. The communication device sends, to an application server site via the communication network, a request message which includes the HTTP cookie. If verification of the digital signature at the application server site is successful, the communication device will receive access to an application service of the application server site. In one variation, the HTTP cookie is alternatively set with a group identification of a group with which the user is associated, and the message portion is signed with a digital signature of the group. The group may be a plurality of users associated with a service provider which provides the communication device access to a communication service in the communication network. In this case, the HTTP cookie may be set with a token retrieved from the service provider, where the token includes the digital signature of the service provider.

22 Claims, 13 Drawing Sheets

(56) References Cited

U.S. PATENT DOCUMENTS

| | | |
|---|---|---|
| 6,587,680 B1 | 7/2003 | Ala-Laurila et al. |
| 7,197,568 B2 | 3/2007 | Bourne et al. |
| 7,206,932 B1* | 4/2007 | Kirchhoff ............... 713/152 |
| 7,243,163 B1* | 7/2007 | Friend et al. ............ 709/248 |
| 7,483,984 B1 | 1/2009 | Jonker et al. |
| 7,890,634 B2* | 2/2011 | Jiang et al. ............. 709/227 |
| 2002/0007461 A1 | 1/2002 | Garrison |
| 2002/0078192 A1* | 6/2002 | Kopsell et al. .......... 709/223 |
| 2004/0054898 A1 | 3/2004 | Chao et al. |
| 2004/0117623 A1* | 6/2004 | Kalogridis et al. ...... 713/165 |
| 2004/0128390 A1 | 7/2004 | Blakley, III et al. |
| 2005/0074126 A1* | 4/2005 | Stanko ..................... 380/279 |
| 2005/0154913 A1 | 7/2005 | Barriga et al. |
| 2006/0123117 A1 | 6/2006 | Heutchy et al. |
| 2008/0052775 A1* | 2/2008 | Sandhu et al. ............ 726/14 |
| 2008/0072301 A1* | 3/2008 | Chia et al. ................. 726/8 |
| 2008/0301773 A1* | 12/2008 | Achtari et al. ............. 726/3 |
| 2009/0044020 A1 | 2/2009 | Laidlaw et al. |

OTHER PUBLICATIONS

Park et al., Trusted Identity and Session Management Using Secure Cookies, 2005, Retrieved from the Internet <URL: link.springer.com/chapter/10.1007/11535706_23#page-1>, pp. 1-15 as printed.*

Haydon et al., Guest posting with CAPTCHA, Mar. 2008, Retrieved from the Internet <URL: phpbb.com/community/viewtopic.php?f=46&t=805645>, pp. 1-2 as printed.*

Hotta et al.; A Design of Client side Information Management Method for Web Services Collaboration; 2007; Retrieved from the Internet <URL: ieeexplore.ieee.org/xpls/abs_all.jsp?arnumber=4427548>; pp. 1-4 as printed.*

Search Report & Written Opinion, PCT application# PCT/CA2010/000247, May 5, 2010.

Extended European Search report mailed Jun. 6, 2014; in corresponding European patent application No. 09155642.3.

Office Action mailed Dec. 30, 2014; in Canadian patent application No. 2,659,128.

* cited by examiner

```
www.tickets.com                  ⊕  ⊡ 🔒 3G ∷ Y..ıl
Paperless Ticket                         No
                                 1202 — Charge
TOTAL CHARGES                         US $ 54.50
Select Payment Method
Credit Card                                      O
Select Credit Card   1204      [MasterCard    ▼]
Credit Card Number             [4890055613472  ]
Expiration Date                        [7     ▼]
                    [2010▼]
Security Code                          [400    ]
Enter Billing Address
Age Restrictions
```
— 222

FIG. 13

```
www.tickets.com                  ⊕  ⊡ 🔒 3G ∷ Y..ıl
Enter the credit card billing address and name exactly
as it appears on your credit card statement.

(your tickets will be shipped to this address)
First Name
[Test                    ]

Last Name
[RimUser                 ]

Address
[2000 Bridge Parkway     ]

Unit # (Optional)
[                        ]
```

1302

— 222

US 9,059,979 B2

COOKIE VERIFICATION METHODS AND APPARATUS FOR USE IN PROVIDING APPLICATION SERVICES TO COMMUNICATION DEVICES

BACKGROUND

1. Field of the Technology

The present disclosure relates generally to cookie verification methods and apparatus for providing application services to communication devices.

2. Description of the Related Art

A communication device, such as a wireless mobile communication device, may operate in a communication network which provides for data and/or voice communications. Such communication device may offer a number of different capabilities or features for a user. Many of these capabilities are defined by the different applications which are installed in the communication device. The communication device may have a data or message synchronization application (e.g. for e-mail messages or calendar items), a Web browser or Internet search application, a voice telephony application, as examples, or combinations thereof. With use of an application, such as a Web browser, a communication device operating in the communication network may interface with an application server of another network (e.g. a public network such as the Internet) to access a service or information.

BRIEF DESCRIPTION OF THE DRAWINGS

Embodiments of present disclosure will now be described by way of example with reference to attached figures, wherein:

FIGS. 9-13 are illustrative views of a visual display of a mobile device when it accesses an exemplary application service of an application server.

DETAILED DESCRIPTION OF THE DRAWINGS

With use of an application, such as a Web browser, a communication device operating in a communication network may interact with an application server of another network (e.g. a public network such as the Internet) to access a service or information. The communication device may be a wireless mobile communication device operative in a wireless communication network. In some cases, it may be beneficial to grant special access privileges only to particular types or groups of devices (e.g. trusted devices) but otherwise deny access.

Additional or other concerns may be that an application server can be vulnerable to automated software from "bots" or the like. In some cases, the application server may utilize means to prevent accessibility to the information or service by such automated software. For example, an application server may utilize a proof-of-work (POW) test, such as a challenge-response test, to prevent such accessibility. One such challenge-response test is a Captcha test ("Completely Automatic Public Turing test to tell Computers and Humans Apart"). For various reasons, however, such challenge-response tests may be inconvenient or otherwise unsuitable for devices, such as mobile communication devices.

It is preferred that convenient accessibility to application services are provided to entrusted devices with use of efficient techniques. The same or similar problems may exist in connection with other environments, networks, and devices.

According to one illustrative example of the present disclosure, a method in a communication device adapted for communications using Hypertext Transport Protocol (HTTP) involves setting, at the communication device, an HTTP cookie which includes a user identification of a user of the communication device and a message portion which is signed with a digital signature of the user. The communication device sends, to an application server site via the communication network, a request message which includes the HTTP cookie. If verification of the digital signature at the application server site is successful, the communication device will receive access to an application service of the application server site; otherwise, access is denied.

In another embodiment, the HTTP cookie is set with a group identification of a group with which the user is associated, and the message portion is signed with a digital signature of the group. The group may be, for example, a plurality of users associated with a service provider which provides the communication device with access to a communication service in the communication network. In this case, the HTTP cookie may include a token retrieved from the service provider, where the token includes the digital signature of the service provider.

In one particular example, the application service is an e-commerce transaction service, wherein a proof-of-work (POW) test (e.g. a Captcha test) otherwise utilized for the service is bypassed or excluded for the entrusted device.

Figure 1:
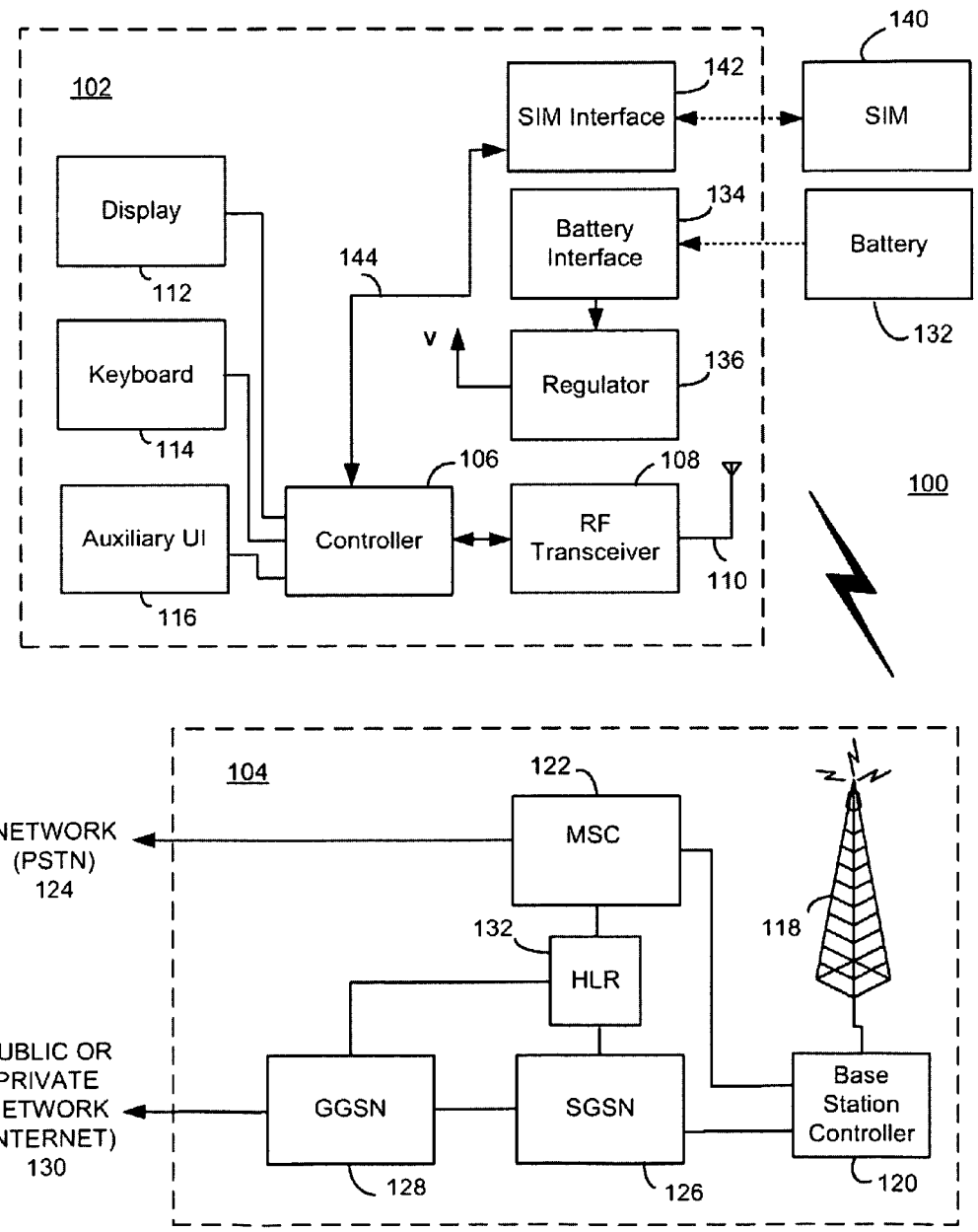
FIG. 1 is a block diagram which illustrates pertinent components of a mobile station and a wireless communication network.

To illustrate exemplary system architecture of the present disclosure, FIG. 1 shows a block diagram of a communication system 100 which includes a mobile 10 station 102 (one example of a wireless or mobile communication device) which communicates through a wireless communication network 104. Mobile station 102 may comprise a visual display 112, a keyboard 114, and perhaps one or more auxiliary user interfaces (UI) 116, each of which are coupled to a controller 106. Keyboard 114 may be substituted with a touch screen display or other suitable input mechanism, or enhanced or replaced with a voice-activated input module. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a tower station 118 and a base station controller (BSC) 120 (described later below), including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 may comprise a battery interface 134 for receiving one or more rechargeable batteries 138. Battery 138 electrical power to electrical circuitry in mobile station 102, and battery interface 134 provides for a mechanical and electrical connection for battery 132. Battery interface 134 is coupled to a regulator 136 which regulates power to the device. Mobile station 102 may comprise a portable communication device (e.g. a handheld portable communication device), which includes a housing (e.g. a plastic housing) which carries and contains the electrical components of mobile station 102 including battery 138. Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. For example, SIM 140 may alternatively be a Universal SIM (USIM) or Removable User Identity Module (RUIM) depending on the particular technology. Without SIM 140, the mobile station terminal may not be fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and/or voice communication capabilities, a personal digital assistant (PDA) enabled for wireless communication, or a computer incorporating an internal modem. As mentioned earlier, mobile station 102 may comprise a portable communication device (e.g. a handheld portable communication device) which includes a housing (e.g. a plastic housing) which carries and contains the electrical components of mobile station 102. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless network 104. Wireless network 104 may comprise a cellular telecommunications network. Wireless network 104 may be owned and/or operated by a service provider (e.g. a wireless carrier, such as AT&T, Rogers Communications, T-Mobile, etc.) which provides a communication service (e.g. a voice telephony service and or packet data service) for mobile stations. In the embodiment of FIG. 1, wireless network 104 is configured in accordance with Global Systems for Mobile communication (GSM) and General Packet Radio Service (GPRS) and technologies. Today, such a mobile station may further operate in accordance with Enhanced Data rates for GSM Evolution (EDGE) or Enhanced GPRS (EGPRS). Note that wireless network 104 may be based on any other suitable network technology or network, such as a Long-Term Evolution (LTE)-based network, an EVolution-Data Only (EV-DO)-based network, a UMTS-based network, or High Speed Packet Access (HSPA). Alternatively, wireless network 104 may be a wireless local area network (i.e. IEEE 802.11), a Bluetooth-based network, a WiMAX-based network (i.e. IEEE 802.16), or a Ultra-WideBand (UWB)-based network (i.e. IEEE 802.15), as a few examples.

In this environment, wireless network 104 may include a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on algorithms, keys, and criteria (e.g. as in existing GSM). In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Figure 2:
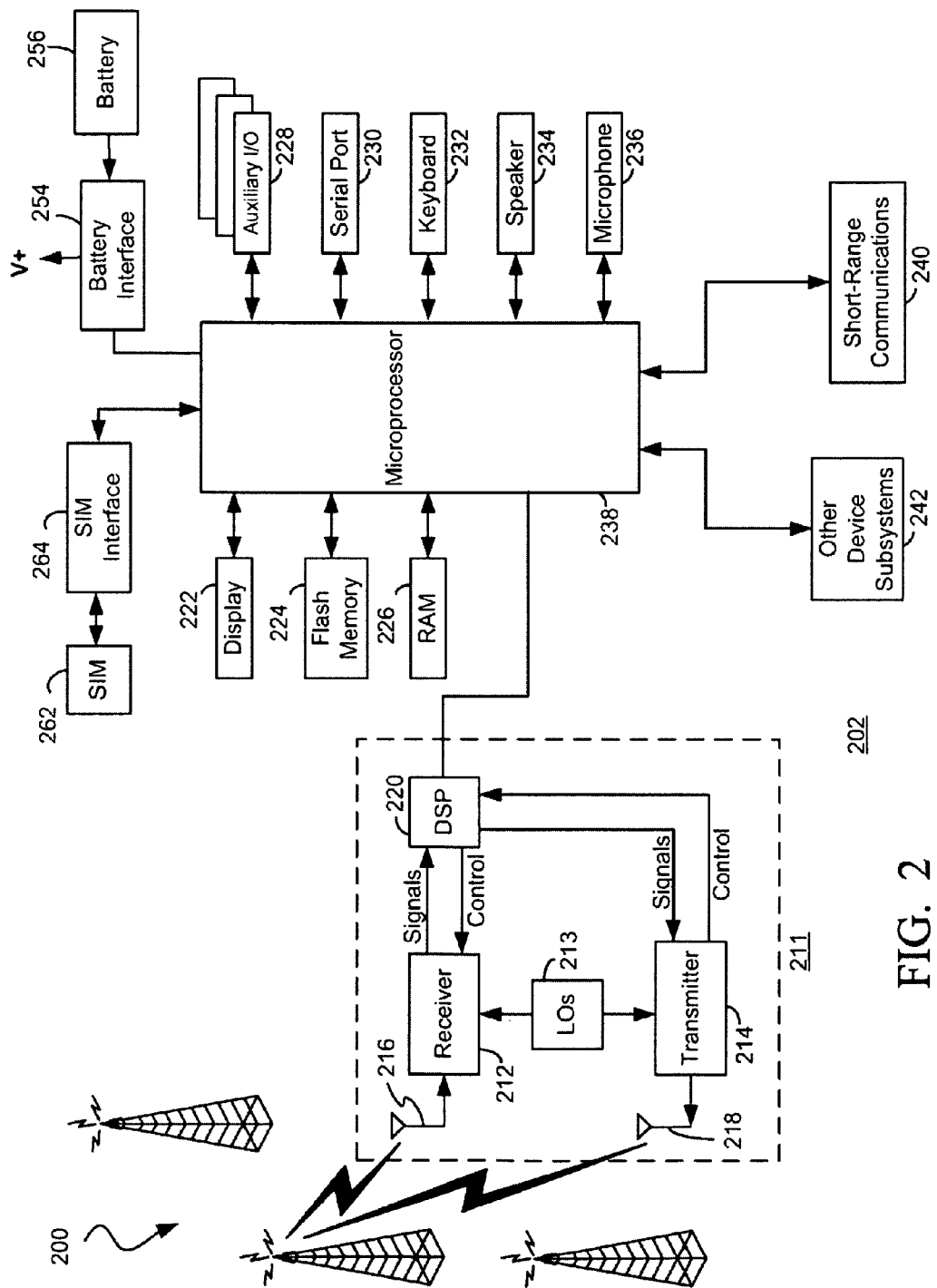
FIG. 2 is a more detailed diagram of an exemplary embodiment of a mobile station.

FIG. 2 is a detailed block diagram of an exemplary mobile station 202 in accordance with various embodiments of the present disclosure. Mobile station 202 may comprise a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more antenna elements 216 and 218 (which may be embedded or internal), local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network(s) in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in the example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 may utilize a Subscriber Identity Module or "SIM" card 262 which may be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 (which is one implementation of controller 106 of FIG. 1) which controls overall operation of mobile station 202. Communication functions, including at least data and/or voice communications, are performed through communication subsystem 211. The communication techniques of the present disclosure may generally be controlled by microprocessor 238 in connection with DSP 220. Microprocessor 238 also interacts with additional device subsystems which may include a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on mobile station 202. A predetermined set of applications which control basic device operations, including at least data and/or voice communication applications, will normally be installed on mobile station 202 during its manufacture. An exemplary application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information. The PIM application may typically have the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This can be especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or a non-volatile store (not shown) for execution by microprocessor 238. Such flexibility in application installation increases the functionality of mobile station 202 and may provide enhanced on-device functions, communication-related functions, or both. These applications will be described later in relation to FIG. 5 below.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 may comprise a complete alphanumeric keyboard and/or telephone-type keypad. Note that keyboard 232 may be substituted with a touch screen display or other suitable input mechanism, or enhanced or replaced with a voice-activated input module. The composed data items may be transmitted over a communication network through communication subsystem 211. For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is typically accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless network. The alternate download path may, for example, be used to load an encryption key onto mobile station 202 through a direct and thus reliable and trusted connection to thereby provide secure device communication. Short-range communications subsystem 240 of FIG. 2 is an additional optional component which provides for communication between mobile station 202 and different systems or devices, which need not necessarily be similar devices.

Figure 3:
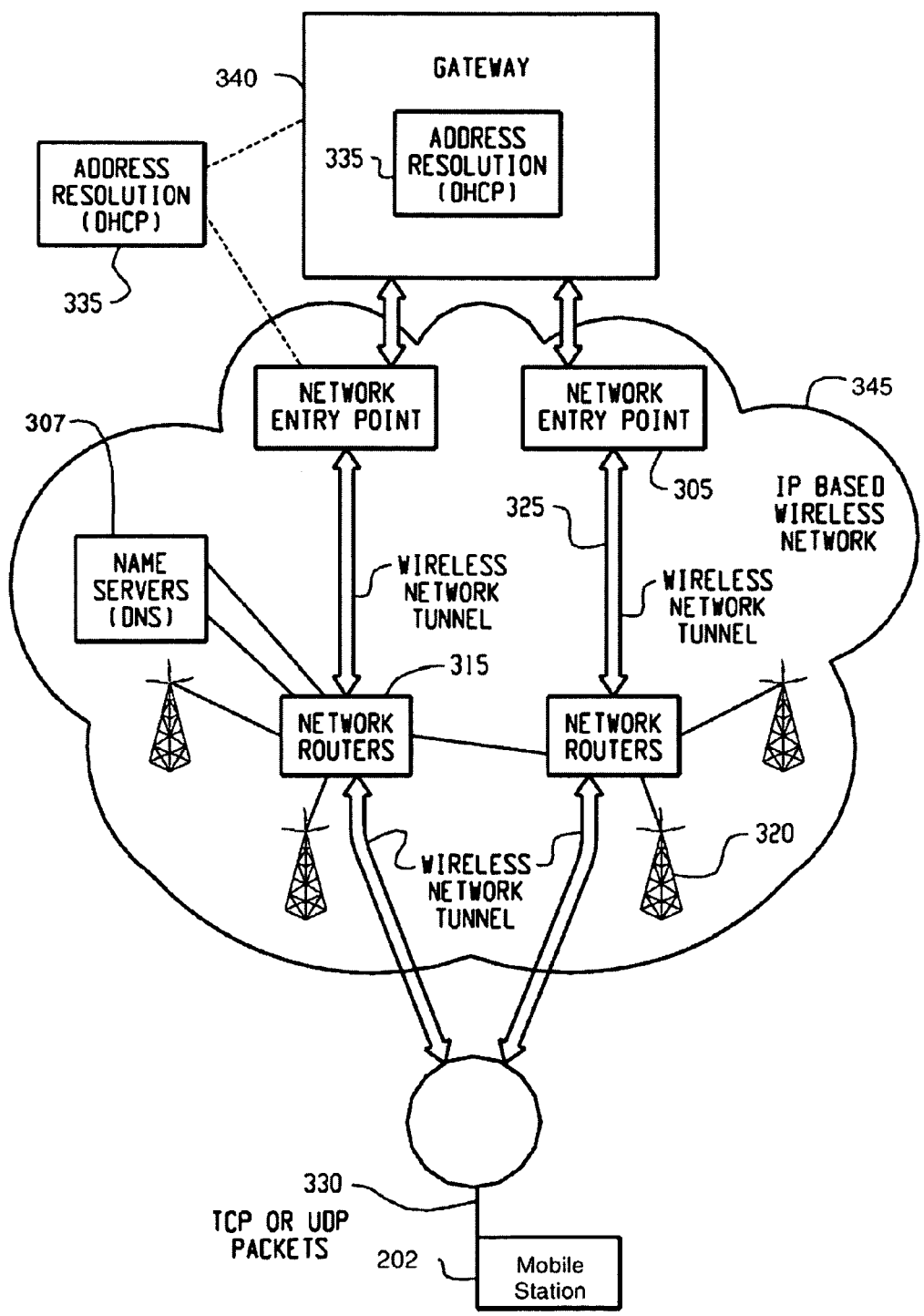
FIG. 3 is a particular system architecture for the mobile station and wireless network of FIGS. 1 and 2 for "pushed" data communications.

FIG. 3 shows a particular system structure for packet data communications with mobile station 202. In particular, FIG. 3 shows basic components of an IP-based wireless data network which may be utilized for "pushed" data communications. Mobile station 202 communicates with a wireless packet data network 345, and may also be capable of communicating with a wireless voice network (not shown). As shown in FIG. 3, a gateway 340 may be coupled to an internal or external address resolution component 335 and one or more network entry points 305. Data packets are transmitted from gateway 340, which is source of information to be transmitted to mobile station 202, through network 345 by setting up a wireless network tunnel 325 from gateway 340 to mobile station 202. In order to create this wireless tunnel 325, a unique network address is associated with mobile station 202. In an IP-based wireless network, however, network addresses are typically not permanently assigned to a particular mobile station 202 but instead are dynamically allocated on an as-needed basis. It is thus typical for mobile station 202 to acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile station 202.

Wireless network tunnels such as a wireless tunnel 325 are opened across wireless network 345 in order to allocate necessary memory, routing, and address resources to deliver IP packets. Such tunnels 325 are activated as part of what are referred to as Packet Data Protocol or "PDP contexts" (i.e. packet data sessions). To open wireless tunnel 325, mobile station 100 must use a specific technique associated with wireless network 345. The step of opening such a wireless tunnel 325 may require mobile station 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 100. When an IP address has been allocated to mobile station 202 and communicated to gateway 340, information can then be forwarded from gateway 340 to mobile station 202.

In this application, an "IP-based wireless network" (one specific type of wireless network) may be or include but is not limited to: (1) a Code Division Multiple Access (CDMA) network; (2) a General Packet Radio Service (GPRS) network for use in conjunction with Global System for Mobile Communications (GSM) network both developed by standards committee of European Conference of Postal and Telecommunications Administrations (CEPT); and (3) future third-generation (3G) networks like Enhanced Data rates for GSM Evolution (EDGE) and Universal Mobile Telecommunications System (UMTS). It is to be understood that although particular IP-based wireless networks have been described, the techniques of the present application could be utilized in connection with any similar type of network (e.g. IEEE 802.11 based WLAN, or WiMAX, etc.). The infrastructure shown and described in relation to FIG. 3 may be representative of each one of a number of different networks which are provided and available in the same geographic region. One of these communication networks will be selected by the mobile station for communications at any given time.

Figure 4:
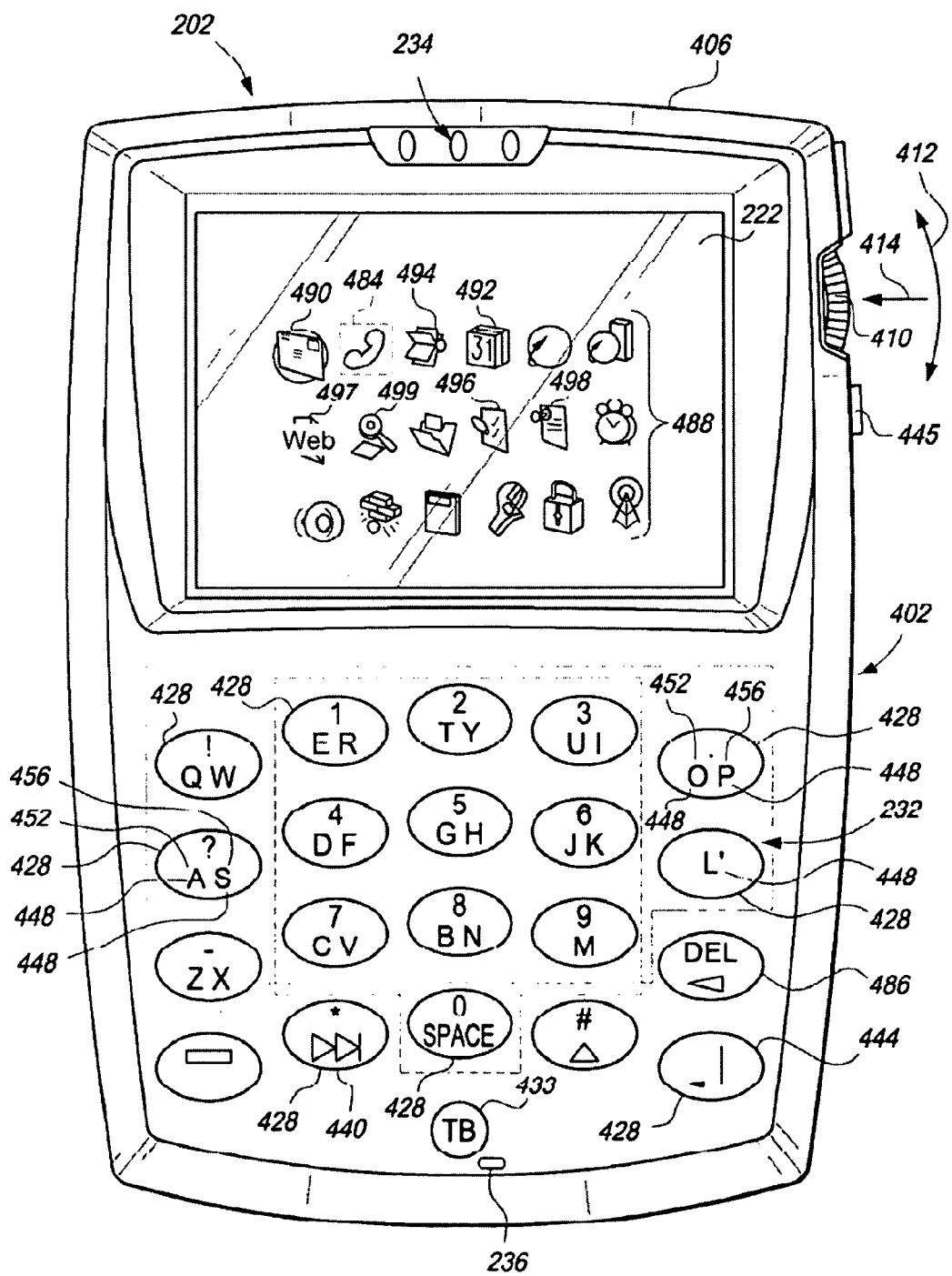
FIG. 4 is an illustrative example of an exemplary user interface of the mobile station of FIGS. 1 and 2.

Referring now to FIG. 4, what is shown is an illustrative representation of an exemplary user interface 402 of mobile station 202 of FIGS. 1 and 2 which includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile station 202 may be sized to be a handheld portable device in various embodiments. As an alternative to or in addition to positioning wheel 410 and/or trackball 433, a wide range of one or more pointing or cursor/view positioning mechanisms such as a touch pad a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, provided for languages other than English, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since the <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor. Display 222 may include a cursor 484 that depicts generally where the next input or selection from user interface 402 will be received. Display 222 is shown in FIG. 4 as displaying a home screen that represents a number of applications 586 (Figure 3 shows some of the example possible applications 86) depicted as corresponding discrete icons 488. Icons 488 may include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
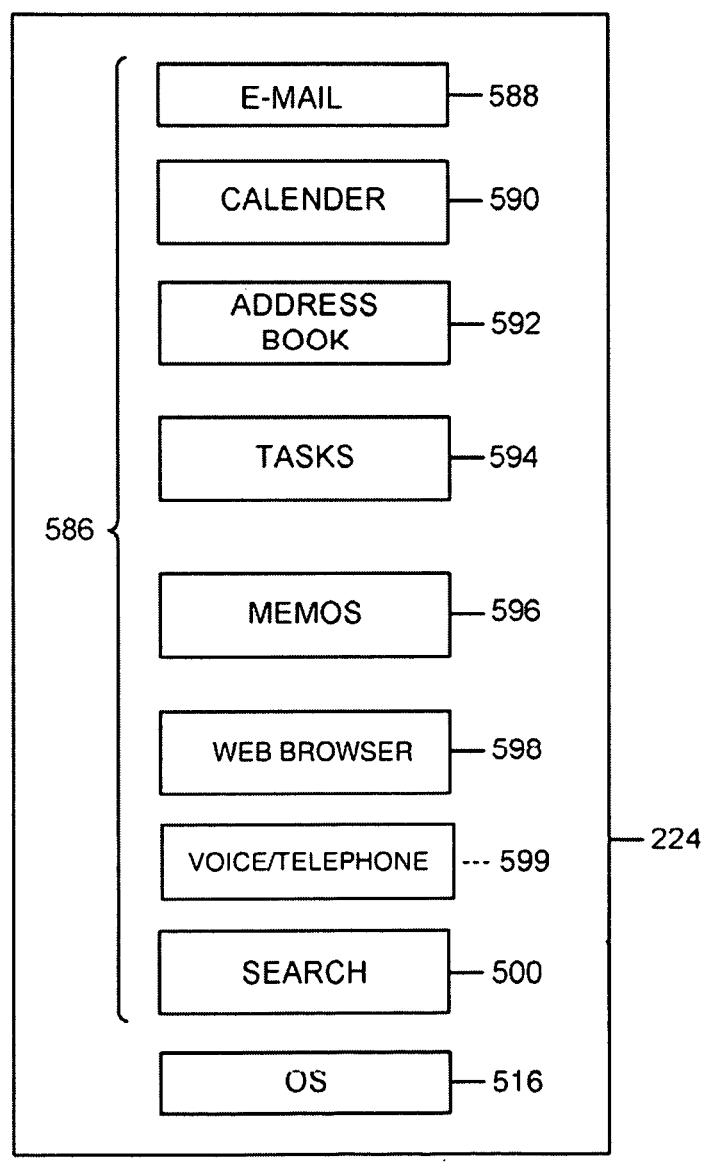
FIG. 5 is an illustrative representation of memory of the mobile station which has a plurality of applications stored therein.

As shown further in FIG. 5, memory 224 of mobile station 202 includes a plurality of applications or routines 586 associated with the visually displayed icons 488 of FIG. 4 for the processing of data. Applications 586 may be in any of a variety of forms such as, without limitation, software, firmware, and the like. Applications 586 may include, for example, an Electronic Mail (E-Mail) application 588 (FIG. 5) associated with E-mail icon 490 (FIG. 4), a Calendar application 590 (FIG. 5) associated with Calendar 20 icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

In FIG. 4, the "home" screen output is shown as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scroll-wheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile station 202 has just been described, any suitable mobile device or terminal may be part of the methods and apparatus which will be described in fuller detail below. Note that many components of mobile device 202 shown and described may not be included. As mentioned earlier, keyboard 232 and/or display 222 may be substituted with a touch screen display and/or other suitable input mechanism, and/or enhanced or replaced with a voice-activated input module.

Figure 6A:
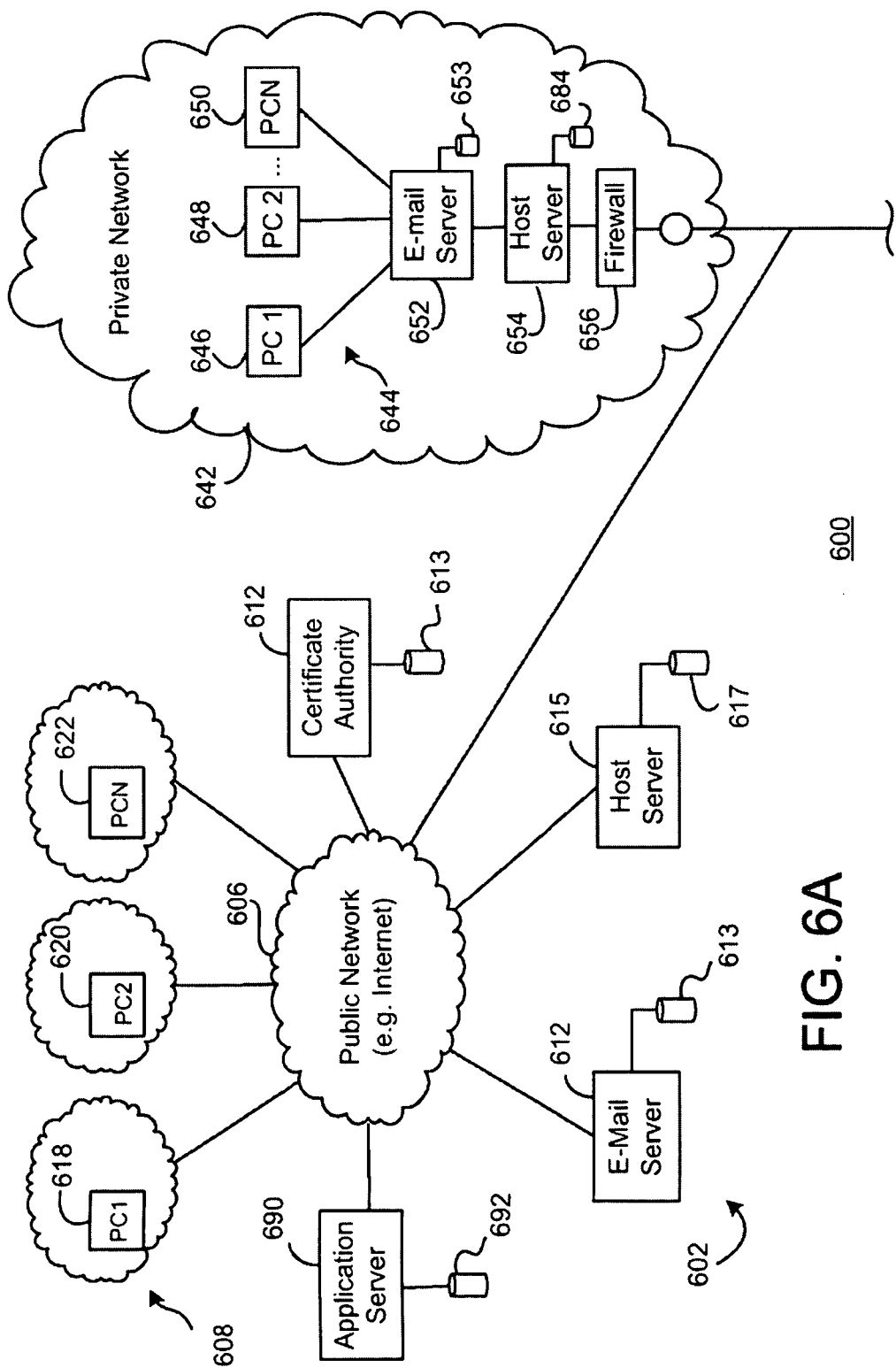
FIGS. 6A, 6B, and 7 show a communication system in which messages containing e-mail information are pushed from e-mail servers to mobile communication devices with use of an e-mail synchronization technique.
Figure 6B:
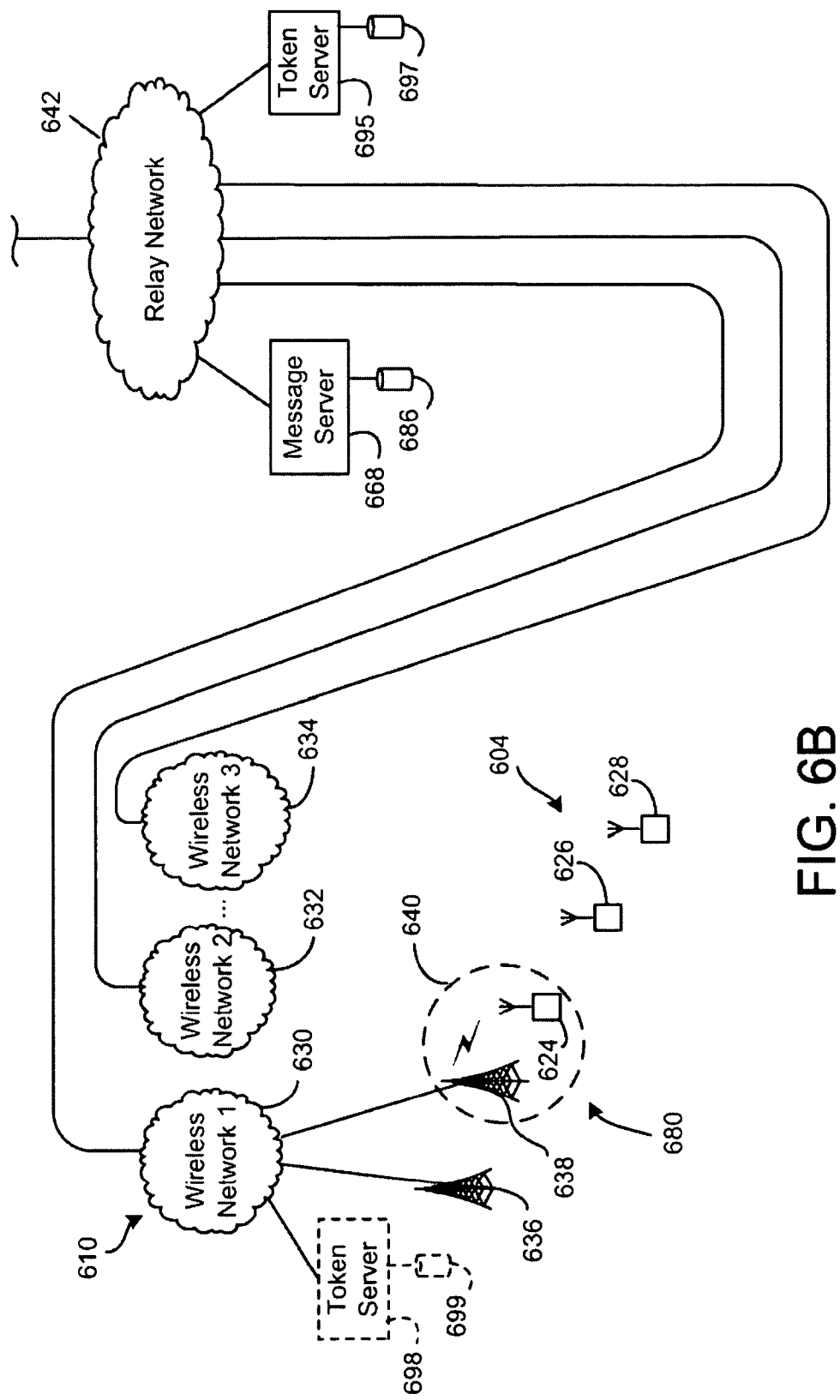

FIGS. 6A and 6B depict a communication system 600 which may be the larger system within which a mobile communication device, such as the mobile station described in relation to FIGS. 1, 2, and 4, may operate. In the particular embodiment of FIGS. 6A and 6B, communication system 600 is a system in which messages containing e-mail information are pushed from a plurality of e-mail servers 602 (FIG. 6A, e-mail servers 612 and 652) to a plurality of mobile communication devices 604 (FIG. 6B) with use of an e-mail synchronization technique. Although messages containing e-mail information are described as being pushed to mobile devices in the present embodiment, messages containing various other types of information, such as calendar information, Internet access, telephone communication information, or other various types of data, may be additionally or alternatively pushed to the devices in a more general data synchronization technique.

The e-mail servers 602 that are shown in FIG. 6A include an e-mail server 612 which serves a plurality of terminals 608 of a public network 606 (e.g. the Internet) and an e-mail server 652 which serves a plurality of terminals 644 of a private network 642. Terminals 608 shown in public network 606 include terminals 618, 620, and 622, whereas terminals 644 shown in private network 642 include terminals 646, 648, and 650. In this embodiment, the terminals are computers such as desktop or laptop PCs which may be connected to e-mail server 612 via the Internet using any conventional means (e.g. telephone dial-up, cable, or DSL modem). End-users of the PCs are able to access their appropriate personal e-mail accounts for sending and receiving new e-mail, as well as reviewing, sorting, organizing, and otherwise managing previously received e-mail stored at the e-mail server.

An end-user of each terminal 608 connected in public network 606 has an e-mail account on e-mail server 612 which stores and manages e-mail messages in a local database 613 of memory for the respective terminal. Each terminal 608 and/or its corresponding e-mail account is associated with a respective one of mobile devices 604 (FIG. 6B) to which e-mail information is pushed. Similarly, an end-user of each terminal 644 connected in private network 542 has an e-mail account on e-mail server 652 which stores and manages e-mail messages in a local database 653 of memory for the respective terminal. Each terminal 644 and/or its corresponding e-mail account is associated with a respective one of mobile devices 604 to which e-mail information is pushed.

Terminals 644 connected in private network 642 and their respectively e-mail accounts are generally affiliated with each other; that is, they may be associated with the same group, enterprise or business. For example, terminals 646, 648, and 650 may be utilized by the same group and use the same network domain name for e-mail purposes. In private network 642, e-mail server 652 and host server 654 privately serve each end user in the network. On the other hand, terminals 608 connected to public network 606 and their respective e-mail accounts are generally unaffiliated with each other; that is, they are not necessarily associated together with the same business or private network. For example, terminals 618 and 620 are not utilized by the same company nor are they part of the same private network. When an end user of one of terminals 608 accesses e-mail, for example, the end user's terminal is used to connect to e-mail server 612 via the Internet through an Internet Service Provider (ISP) using an appropriate Uniform Resource Locator (URL) (e.g. for a webmail-based service). Using the terminal, the end user sends his/her individual user name and password to log on to this e-mail server. If this user name and password information matches that stored at the e-mail server, the login is successful and an e-mail session is created so that the end-user can perform e-mail tasks.

Each mobile device 604 (FIG. 6B) is portable and includes, for example, a housing with a display and an input mechanism (e.g. keyboard/keypad), as well as a wireless transceiver, an antenna, and one or more processors which control the operation of the device. For example, see FIGS. 1 and 2. Each wireless communication network 610 is coupled to a plurality of base stations for providing wireless coverage for a mobile station. For example, wireless network 630 is shown to have a plurality of base stations 680 including a base station 636 and a base station 638. Each base station (e.g. base station 638) helps establish a wireless coverage area or cell (e.g. a cell 640) within which a mobile device (e.g. mobile device 624) is able to communicate. Wireless networks 610 may include, as examples, cellular telecommunication networks and wireless local area networks (WLANs) (e.g. 802.11 based networks). At least some of wireless networks 610 are different from other wireless networks within communication system 600.

Each mobile device 604 has the ability to send and receive e-mail information associated with its e-mail account managed by one of e-mail servers 612 and 652. The e-mail information may be received by each mobile device 604 via a (substantially) real-time automatic "push" methodology, in contrast to any method requiring devices 604 to invoke a manual connection for the receipt of e-mail information. The pushing of e-mail information from e-mail servers 612 and 652 to mobile devices 604 is facilitated with use of host servers 615 and 654, respectively, which are coupled to a relay network 642 (FIG. 6B). In private network 642, host server 654 communicates with relay network 642 through a firewall 656 which performs at least the conventional function of preventing unauthorized access into such network 642. A trigger mechanism is provided so that, when new e-mail messages are received or updated e-mail information is identified, host server 654 (or host server 615) receives a copy of such information from e-mail server 652 (or e-mail server 612) for delivery to a mobile device. Host server 654 has a local database 684 in memory for storing (at least temporarily) such e-mail information received from e-mail server 652, and host server 615 has a local database 617 in memory for storing (at least temporarily) such e-mail information received from e-mail server 612.

Relay network 662 is communicatively coupled to wireless networks 610 for relaying messages to mobile devices 604. Relay network 662 includes a message server 668 and a token server 695. Message server 668 handles all incoming messages from all host servers into the relay network 662. In general, when a new e-mail message is received at an e-mail server (e.g. e-mail server 652), its corresponding host server (e.g. host server 654) is adapted to receive a copy of e-mail information of the e-mail message for delivery in a message to the associated mobile device. Host server 654 causes this message to be delivered to relay network 642, which relays the message to the mobile device through the appropriate wireless network. Note that relay network 642 may serve a very large number of such host servers and networks (which include host servers 615 and 654 in networks 606 and 642, respectively) for communicating messages generally in this fashion.

Terminals may also be able to interact with application server 690 which is accessible via a communication network, such as, public network 606. Application server 690 may include a server program of a computer that provides business logic for an application program. Application server 690 may provide, for example, data, content, file documents, etc., to its client terminals. In addition, application server 690 may provide a service to its client terminals, such as a file storage and retrieval service, a goods and/or service purchasing service, or an e-commerce transaction service, etc., to its client terminals.

Application server 690 may part of a three-tier architecture which includes a graphical user interface (GUI) server, an application (business logic) server, and a database and transaction server. More specifically, application server 690 may be viewed as part of (a) a first-tier, front-end, Web browser-based graphical user interface, usually at a personal computer or workstation; (b) a middle-tier business logic application or set of applications, possibly on a local area network or intranet server; and (c) a third-tier, back-end database and transaction server, oftentimes on a mainframe or large server. As apparent, application server 690 may be part of a middle structure between browser-based front-ends and back-end databases and/or legacy systems. Application server 690 may also be part of or include a Web server (or HTTP server) and be referred to as a Web application server. A Web browser of a client terminal supports an HTML-based front-end, and the Web server operates to forward a request to an application server and respond back with a modified or new Web page. Such approaches may make use of a Common Gateway Interface (CGI), FastCGI, Active Server Pages (ASPs), and Java Server Pages (JSPs). In some cases, the Web application server may support request "brokering" interfaces, such as the CORBA Internet Inter-Orb Protocol (IIOP). The term "application server site" refers to any one of these server architectures or similar ones.

With respect to mobile devices, application server 690 may be further adapted to operate in accordance with a wireless access protocol (WAP). WAP is an open international standard for application layer network communications in a wireless environment. A WAP browser in the mobile device is adapted to facilitate all of the basic services of a computer-based web browser, but is simplified to operate within the restrictions of a small, portable device (e.g. its smaller display screen). WAP sites are websites are typically written in, or dynamically converted to, Wireless Markup Language (WML) and accessed via the WAP browser. Thus, application server 690 may have applications which provide WML data to mobile devices.

Application server 690 may also store in its database 692 a digital certificate of the service provider. The digital certificate has a public key corresponding to the service provider. The digital certificate (public key) may be viewed as being associated with a group of subscribers or mobile devices. Note that application server 690 may in fact store a plurality of digital certificates/public keys associated with different service providers.

Figure 7:
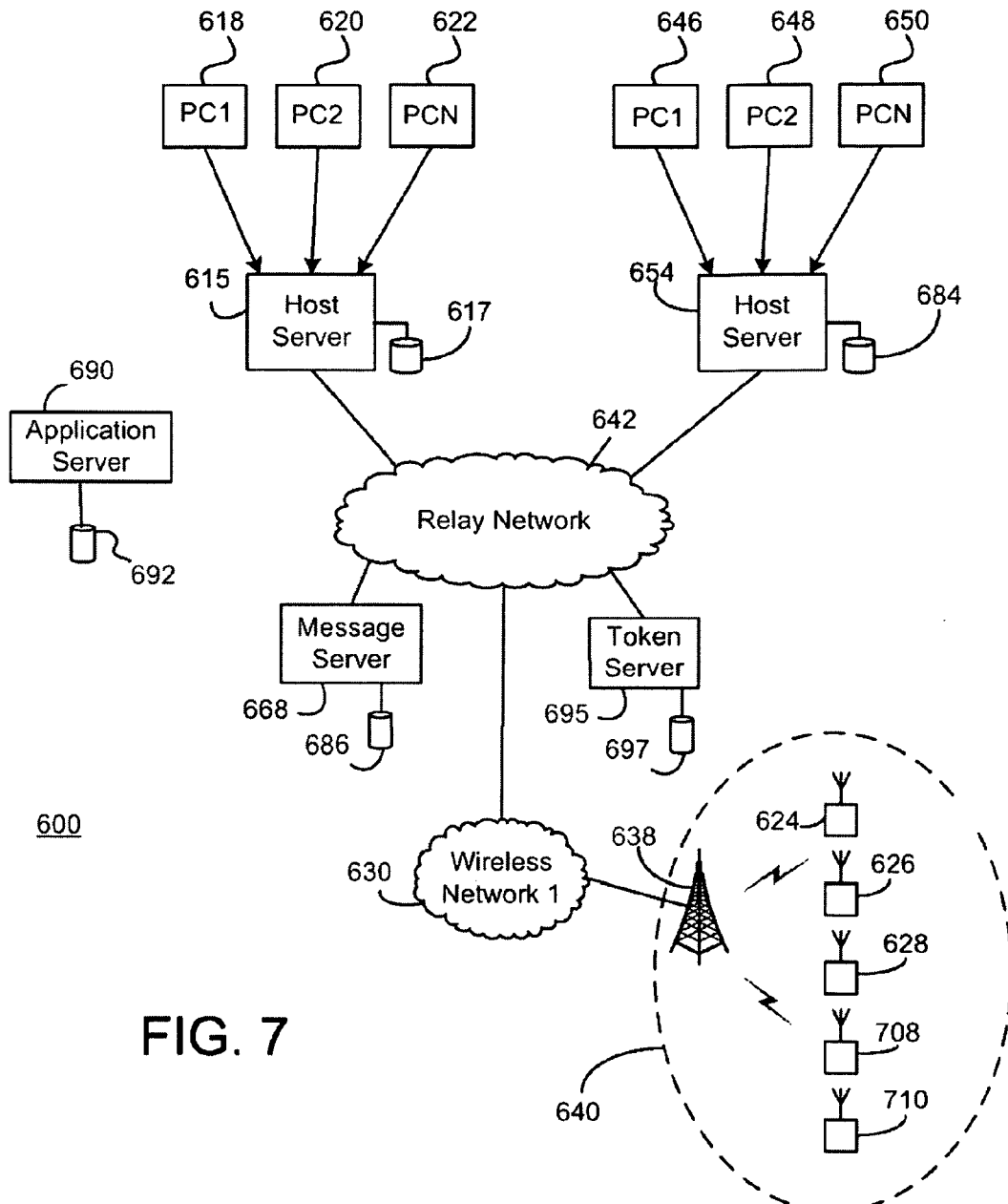

Referring now to FIG. 7, an illustration of a simplified relevant portion of the system of FIGS. 6A-6B is shown. FIG. 7 shows host servers 615 and 654, application server 690, message server 668 and token server 695 of relay network 642, wireless network 630, and various terminals and mobile devices operating within their associated networks. In relay network 642, messages containing e-mail information from host servers 615 and 654 are received by message server 668 which, under normal circumstances, will communicate them for delivery to the mobile devices.

The pushing of information to mobile devices as described may be part of a "data synchronization" of data items between an application program of the host server and a corresponding application program at the mobile device. The host server is operative to maintain data synchronization with the mobile device over the wireless network for user data of the application program associated with a user account. For the data-synchronized communications, the host server maintains storage of a mapping of a user account name or identifier of the user account with a personal identification number (PIN) of the mobile device. Alternatively, the PIN may be or be referred to as a product identification number. When communications are required with the mobile device, the PIN may be used to route the messages to/from the source device through the system. As described above, the application program may be or include, for example, an e-mail application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program.

Wireless network 630 may be owned and/or operated by a service provider (e.g. a wireless carrier, such as AT&T, Rogers Communications, T-Mobile, etc.) which provides a communication service (e.g. a voice telephony service and/or packet data service) for mobile devices. Similarly, relay network 642 may also be owned and/or operated by a service provider (e.g. a data service provider) which provides an additional communication service (e.g. a data communication service, such as the data synchronization service for "BlackBerry" products). The service provider for the voice telephony service may be different from the service provider for the data communication service; however, the services providers for these services may be the same.

In order to access and utilize the communication service(s), the mobile device is typically activated and has a valid subscription for the service. After the subscription is setup (e.g. via purchase) and the mobile device is activated, the mobile device is able to gain access to the communication service via the wireless network upon registration or access. At this time, the mobile device sends its identity and/or credentials for verification and/or authentication by the service provider via the wireless network. The information may be or include, for example, information on a SIM of the mobile device, a subscriber identity, a subscriber key, a PIN, a telephone number, an e-mail address, or combinations thereof. The network may perform verification and/or authentication techniques which may be or include a database or memory check for a valid subscription stored in association with the information; an authentication, authorization and accounting (AAA) procedure; extensible authentication protocol (EAP) procedure; or variations or combinations of the same. If the verification and/or authentication by the service provider in the network is successful, the mobile device gains access to and may utilize the communication service. The mobile device may also gain access to and utilize any networks and servers (e.g. token server 695) of the service provider. If unsuccessful, the mobile device cannot gain access to the communication service of the service provider and it associated networks and servers.

Certificate authority 612 has a server which maintains and interacts with a database 613 of digital certificates, each of which is uniquely associated with a respective owner. Digital certificates typically contain an identity of the owner (e.g. a service provider of a communication service) and a public key. The matching private key is not similarly made available publicly, but is kept secret by the owner. As is known, a digital certificate is based on a cryptographic system that uses two keys, a public key which is publicly available and a private (or secret) key known only to the holder of the digital certificate. A digital certificate includes a collection of data used to verify the identity of the holder of the certificate. A digital certificate (e.g. a X.509 based certificate) may contain information which includes identifiers or indicators of a version, a serial number, a certificate issuer, a certificate holder, a validity period (the certificate is not valid before or after this period), attributes (known as certificate extensions, that contain additional information such as allowable uses for this certificate), a digital signature from a certification authority (CA) (to ensure that the certificate has not been altered and to indicate the identity of the issuer), a public key of the owner of the certificate, and a message digest algorithm used to create the signature. The digital signature identifies or indicates the digital certificate of the signer, and the digital certificate contains a digital signature which further identifies or indicates another digital certificate. In general, each digital certificate is verified through the use of another digital certificate, creating a chain of digital certificates that ends with the root digital certificate. The owner of the root certificate is the root certification authority. Thus, a digital certificate may be considered an attestation by the certificate authority that the public key contained in the certificate belongs to the identified owner. A certificate authority's obligation in such schemes is to verify an applicant's credentials, so that users and relying parties can trust the information in the certificate authority's certificates. Certificate authorities use a variety of standards and tests to do so. If the recipient trusts the certificate authority and can verify the certificate authority's signature, then the user can confirm that the public key does indeed belong to the owner.

More specifically, one of the digital certificates maintained by certificate authority 612 in database 613 is associated with the data service provider of the data communication service (e.g. the data synchronization service). A private key corresponding to and uniquely associated with the data service provider may be securely held and stored in database 697 of token server 695, and used for digitally signing each token. When an authorized mobile device requests a token from token server 695, token server 695 generates a token and digitally signs the token with use of the private key. The token server 695 sends the token to the mobile device, but note that the private key of the data service provider is not (and in some embodiments, preferably never) passed to the mobile device. The mobile device includes the received token in a message(s) sent to application server 690. Since application server 690 has previously received the digital certificate of the data service provider from certificate authority 612 by request via the network, application server 690 is able to verify the digital signature of the token with use of the public key corresponding to the data service provider.

In another embodiment, or in combination with the above, one of the digital certificates maintained by certificate authority 612 in database 613 is associated with the wireless carrier of the voice telephony service. A private key corresponding to and uniquely associated with the wireless carrier may be securely held and stored in a database 699 of a token server 698, and used for digitally signing each token. When an authorized mobile device requests a token from token server 698, token server 698 generates a token and digitally signs the token with use of the private key. The token server 698 sends the token to the mobile device, but note that the private key of the wireless carrier is not (and in some embodiments, preferably never) passed to the mobile device. The mobile device includes the received token in a message(s) sent to application server 690. Since application server 690 has previously received the digital certificate of the wireless carrier from certificate authority 612 by request via the network, application server 690 is able to verify the digital signature of the token with use of the public key corresponding to the wireless carrier.

According to one aspect of the present disclosure, if mobile device 624 successfully accesses a communication service via the wireless network 630, it is able to gain access to at least some of the network(s) and server(s) of the service provider. Such access includes access to the token server of the service provider's network (e.g. token server 695 or 698). Thus, mobile device 624 may request and successfully receive a token from token server 695 of the service provider. The token includes a digital signature of the service provider. Mobile device 624 then sends a message to application server 690 which includes the token having the digital signature of the service provider. Application server 690 receives the message and, in response, performs token validation. The token validation at application server 690 includes at least a verification step for verifying the digital signature of the token with a public key corresponding to the service provider. If the token validation is successful, application server 690 grants the mobile device 624 access to an application service of application server 690 via wireless network 630. On the other hand, if the token validation is unsuccessful, application server 690 denies access to the application service. For example, application server 690 may be adapted to provide an e-commerce transaction service for mobile device 624 if token validation is successful; otherwise the e-commerce transaction service is denied. In a more particular example, application server 690 may be adapted to provide a proof-of-work (POW) test for performing an e-commerce transaction via the application server 690, but will bypass or exclude the POW test for mobile device 624 if the token validation is successful.

Figure 8A:
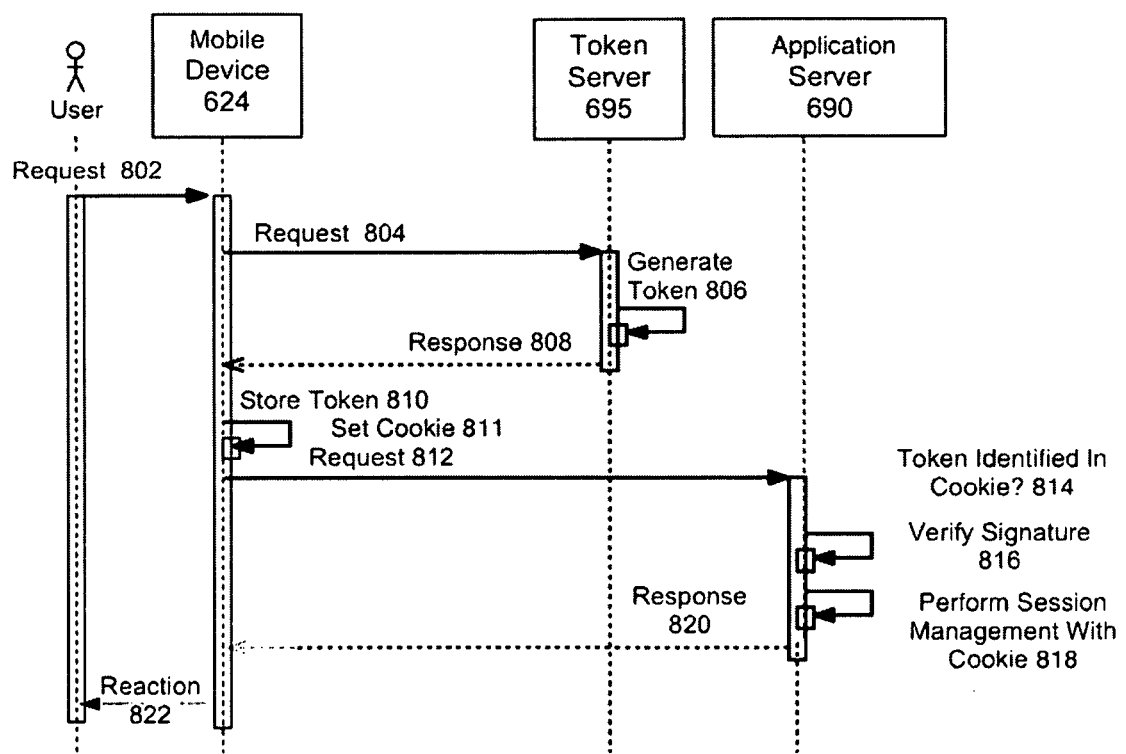
FIG. 8A is a first process flow diagram for describing a first method for use in providing an application service of an application server to mobile communication devices, where an HTTP cookie having a message portion which includes a digital signature of a user of the mobile device is utilized for verification.

FIG. 8A is a process flow diagram 800 for describing a first method for use in providing an application service to mobile communication devices. This technique relates to use of an HTTP cookie which includes a message portion having a digital signature of the service provider of mobile device 624 (e.g. the service provider representing a group of which the user of mobile device 624 is a part). Such techniques may be embodied as computer instructions stored in a storage medium (e.g. computer disk, memory, etc.) and executable by a computer processor of the mobile device or the server. Although the process described focuses on a single mobile device interacting with a single application server, the process is actually performed for a plurality of mobile devices that desire service access to one or more such application servers.

Prior to operation and use, mobile device 624 is activated and has a valid subscription for a communication service. Thereafter, mobile device 624 is able to gain access to the communication service via the wireless network upon registration or access. At this time, mobile device 624 sends its identity and/or credentials for verification and/or authentication by the service provider via the wireless network (e.g. as described earlier above). If the verification and/or authentication by the service provider in the network is successful, mobile device 624 gains access to and may utilize the communication service via the wireless network. Mobile device 624 may also gain access to and utilize any networks and servers (e.g. token server 695) of the service provider. If unsuccessful, mobile device 624 cannot gain access to the communication service of the service provider and its associated networks and servers.

During operation of mobile device 624 in the wireless network, a user of mobile device 624 wishes to access data or a service of application server 690. The user may therefore utilize the user interface of mobile device 624 to invoke or initiate access to the data or service of application server 690 (e.g. typing in a Uniform Resource Locator (URL) of application server 690 or clicking on an icon), to thereby initiate a request (step 802 of FIG. 8A). In response, mobile device 624 identifies whether it has a valid token (already) stored in memory to submit to application server 690 for proper access. If a valid token is already stored in its memory, the process flow will continue at step 812. Otherwise, if there is no valid token stored in its memory, mobile device 624 sends, via the wireless network, a request message for a token to token server 695 (step 804 of FIG. 8A) in response to the user's request.

In response to the request message for the token, token server 695 produces a token for the mobile device 624 (step 806 of FIG. 8A) and sends the token to mobile device 624 via the wireless network in a response message (step 808 of FIG. 8A). Mobile device 624 receives the token and stores it in its memory (step 810 of FIG. 8A). The token may include information such as a sequence number for uniquely identifying the token, an identification of mobile device 624 (e.g. its PIN), and a timestamp of the current date and/or time. The token is also digitally signed by token server 695 with use of the private key of the service provider. Steps 804 to 810 may be performed without user intervention or knowledge of the same.

Below is Table 1 which illustrates an example of token information in the token which his provided in the HTTP cookie. The token may include one or more of the following items of information.

TABLE 1

| | | | | | |
|---|---|---|---|---|---|
| One example of token information. | | | | | |
| Name | Minimum Length (Bytes) | Maximum Length (Bytes) | Format | Example | Description |
| VER | 1 | 7 | UTF-8 | 1.0.0.0 | Protocol Version Number |
| KEYID | 1 | 7 | UTF-8 | 1 | Key Version |

TABLE 1-continued

One example of token information.

| Name | Minimum Length (Bytes) | Maximum Length (Bytes) | Format | Example | Description |
|---|---|---|---|---|---|
| TIME | 19 | 19 | ISO 8601 | 2008-05-28T16:23:15Z | Token Generation Date And Time |
| PIN | 10 | 10 | 64-bit hex integer | 0xFFFFFFFF | Device's PIN Number |
| SEQID | 1 | 10 | 64 bit long integer | 285896 | Sequence Number |
| SIG | — | — | CMS/PKCS7 | — | Digital Signature |
| PARTID | variable | Variable | UTF-8/X509 Name/X509 Certificate | BlackBerry | Identifies Provider/Partner |

Note that SEQID corresponds to and uniquely identifies the particular token utilized (i.e. distinguishes the token from other tokens). PARTID corresponds to and/or uniquely identifies the associated service provider (i.e. the group identification, e.g. a wireless carrier or data service provider; i.e. it distinguishes the provider from other providers). UTF refers to Unicode Transformation Format. PKCS refers to Public Key Cryptography Standard. In another embodiment, the entire digital certificate of the service provider may be included as PARTID in the token as an alternative.

Once the valid token is received or confirmed, mobile device 624 causes an HTTP cookie in the (browser) application to be set (step 811 of FIG. 8A). In particular, the HTTP cookie is set to be or include the received token from the token server. Mobile device 624 may initiate the cookie setting by submitting a "Set-Cookie" request to the application via an Application Programming Interface (API) of the application.

Note that traditionally, cookies are set in a Web browser upon receipt of a "Set-Cookie" header string from the server in response to a HTTP request, where the server is the originator of the name and value (e.g. randomly selected) for the cookie. As apparent, the HTTP cookie in the present technique is initialized by mobile device 624, and at least has a group identification of a group with which the user is associated (e.g. a plurality of subscribers of the service provider) as well as a message portion which is signed with a digital signature of the group. Next, mobile device 624 produces and sends a message to application server 690 as part of the device's response to the user's initial input request from step 802 (step 812 of FIG. 8A). Mobile device 624 formats the message to include the HTTP cookie having the token in a predetermined field (e.g. header field) of the message.

Application server 690 receives the message from mobile device 624 and processes it. For one, application server 690 may perform validation of the message. For example, application server 690 may test whether a token is identified in the HTTP cookie within the predetermined field of the message (step 814 of FIG. 8A). If a token exists as identified by application server 690, then this verification step is successful; otherwise, if no valid token is identified in the predetermined field, the verification step fails. Further, the application server 690 may determine whether the token is signed by the service provider (step 816 of FIG. 8A). Such a positive verification identifies that the mobile device is indeed a subscriber of the service provider (and e.g. not a subscriber of a different service provider). Here, application server 690 attempts to verify the digital signature with a public key corresponding to the service provider (which may be obtained from certificate authority 612). If the digital signature is successfully verified by application server 690 with the public key, then this verification step is successful; otherwise the verification step fails.

The specific actions taken for verification of the digital signature will depend on the protocol or algorithm selected and utilized for its creation. The underlying algorithm may be or be based on Digital Signature Algorithm (DSA), RSA, or other suitable algorithm. For example, Elliptic Curve Digital Signature Algorithm (ECDSA) may be utilized. In one particular example, ECDSA with P521 is utilized for It producing and verifying signatures; if ECC technology is not available, RSA 3072 may be utilized.

If all such verifications are successful (e.g. in steps 814, 816), then validation is successful. Application server 690 sends a response message with access to the data or service as requested (step 820 of FIG. 8A), operating to perform session management and control with use of the HTTP cookie (step 818 of FIG. 8A). Thus, application server 690 grants mobile device 624 access to the application service via the wireless network if the validation is successful and denies mobile device access 624 to the application service if the validation is unsuccessful.

As indicated, application server 690 operates to perform session control and management with use of the HTTP cookie. In itself, HTTP is a stateless protocol; that is, it does not inherently correlate request/response messages with earlier transactions between the same client and server. Here, the cookie is utilized to indicate a specific client state for better session control and management in relation to different users. The browser application stores the cookie and, each time the application requests a page from the server, the cookie is sent to the server. When a subsequent request for another page of the same server is submitted (in the same or different communication session), the server identifies that the request is related to the previous one to maintain coherency of the session.

Although the exact format of the cookie may vary, the cookie typically includes information which includes a name, a value, a domain, and a path. The "name" relates to the name of the cookie variable (for example, "UserID"). The "value" is the string value assigned to the cookie variable. For example, the cookie variable named "UserID" could be set to a value of "334". The "domain" instructs the browser application to which web domain the cookie should be sent. On the other hand, the "path" specifies a directory where the cookie is active; it is the top level of the subtree within the domain for which the cookie is valid, and returned upon access to a page within the subtree. The cookie may also be provided with an expiration date which instructs the browser application when to delete the cookie. If no expiration date is provided, the cookie is deleted at the end of the session, when the browser application is exited. The expiration date is a means for making cookies survive across different sessions.

Application server 690 may further utilize the HTTP cookie to provide user or group personalization or preferences. For example, application server 690 may allow the user or group (via an administrator) to select and store how data is to be displayed (personalizing the pages). These preferences may be maintained across multiple sessions of the user or group. A user or group (via an administrator) may select one or more preferences by indicating or entering preference data in a form and submitting it to the server. The preference data may be stored at application server 690 in relation to the user/group identification.

Even further, application server 690 may provide additional authentication in relation to the HTTP cookie through use of additional authentication information. For example, a login requirement may be required of mobile device 624 for authentication on the first visit or session at application server 690. In this case, the user may insert a username and password in the text fields of a login page and send them to the server. Application server 690 receives username and password, and checks them; if they are correct, application server 690 provides access and sends back a page confirming that the login was successful (and otherwise denying the access). Here, note that the cookie may be made valid for only the current browser session. Alternatively, the cookie may be set to expire at a future date, in which case the same cookie may be provided on future visits for without any login requirement.

In one embodiment, the message in step 812 is a request message of data, and specifically may be a Hypertext Transfer Protocol (HTTP) request message. The token may be included in an HTTP header field, or alternatively an HTTP footer field or an HTTP body field, as examples. In response to the HTTP request message, application server 690 will generate and send display data for mobile device 624. Upon receipt of the display data, mobile device 624 renders text, graphics, images, other information, or combinations of the same based on the display data. The display data may be, for example, Hypertext Markup Language (HTML) data, eXtensible Markup Language (XML) data, Simple Object Access Protocol (SOAP), or data having another suitable format.

Again, mobile device 624 may send the same HTTP cookie in each one of a plurality of subsequent messages of the same communication session submitted to application server 690. Here, application server 690 may expect to receive and process the HTTP cookie as described herein for each such message. In one variation, mobile device 624 sends the same HTTP cookie in each one of the plurality of subsequent messages (at least of the same communication session) submitted to application server 690, but an initial single validation by application server 690 is deemed sufficient so that application server 290 may refrain from validating each subsequent request message (at least of the same communication session). Here, application server 690 still processes the HTTP cookie in each subsequent message for session control and management.

Figure 8B:
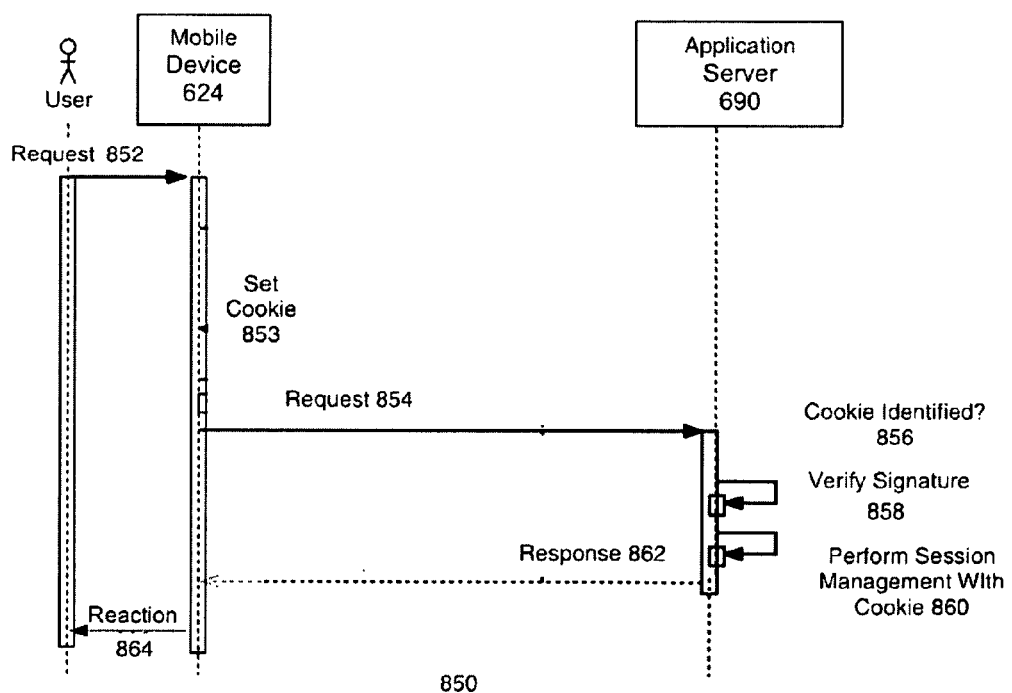
FIG. 8B is a second process flow diagram for describing a second method for use in providing the application service of the application server to mobile communication devices, where an HTTP cookie having a message portion which includes a digital signature of a group with which the user of the mobile device is associated is utilized for verification.
Figure 9:
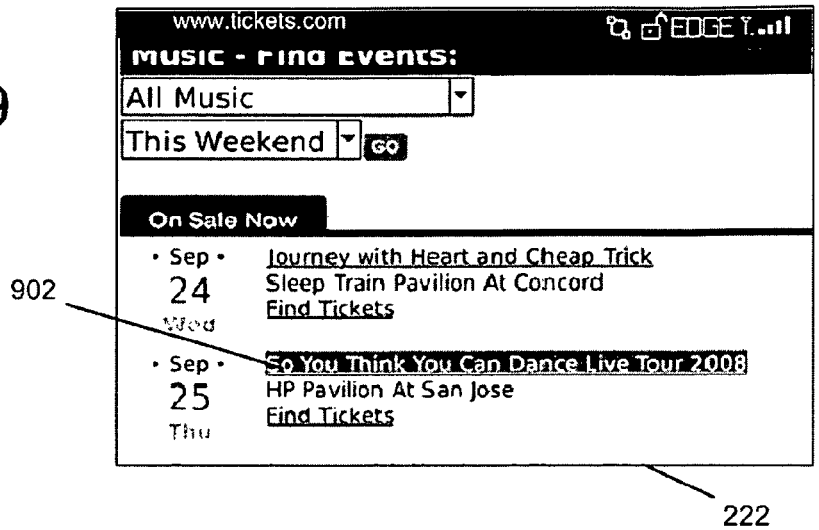
Figure 10:
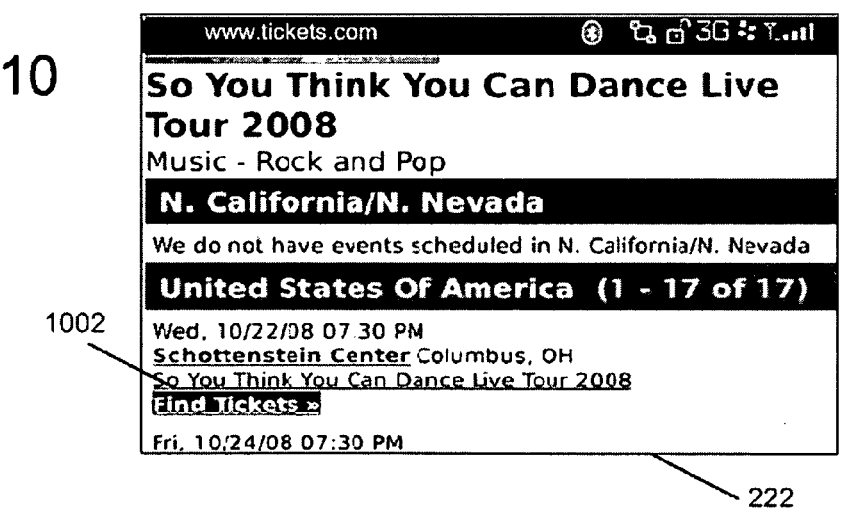

FIG. 8B is another process flow diagram 850 for describing a second method for use in providing an application service to mobile communication devices. This technique relates to use of an HTTP cookie which includes a message portion having a digital signature of the user of mobile device 624. Such techniques may also be embodied as computer instructions stored in a storage medium (e.g. computer disk, memory, etc.) and executable by a computer processor of the mobile device or the server. Although the process described focuses on a single mobile device interacting with a single application server, the process is actually performed for a plurality of mobile devices that desire service access to one or more such application servers.

In this embodiment, and referring back to FIG. 6A, one of the digital certificates maintained by certificate authority 612 in database 613 is associated with the user of mobile device 624. In fact, each one of the plurality of users having mobile It devices may have a digital certificate maintained by certificate authority 612. A private key corresponding to and uniquely associated with the user of mobile device 624 may be securely held and stored in memory of mobile device 624, and used for digitally signing messages by mobile device 624. As discussed below, mobile device 624 may operate to digitally sign a message portion of an HTTP cookie with use of its private key, and provide it in a message(s) sent to application server 690. Since application server 690 may receive the digital certificate (e.g. public key) of mobile device 624 from certificate authority 612 by request via the network, application server 690 is able to verify the digital signature in the HTTP cookie with use of the public key corresponding to mobile device 624. Note that application server 690 may in fact store in its database 692 a plurality of digital certificates/public keys associated with different users having communication devices.

Referring again to FIG. 8B, during operation of mobile device 624 in the wireless network, a user of mobile device 624 wishes to access data or a service of application server 690. The user may therefore utilize the user interface of mobile device 624 to invoke or initiate access to the data or service of application server 690 (e.g. typing in a Uniform Resource Locator (URL) of application server 690 or clicking on an icon), to thereby initiate a request (step 852 of FIG. 8B). In response, mobile device 624 identifies whether it has a cookie set in memory to submit to application server 690 for proper access. If a valid cookie is already set, the process flow will continue at step 854.

If there is no valid cookie set, mobile device 624 causes an HTTP cookie in the (browser) application to be set (step 853 of FIG. 8B). In this embodiment, the HTTP cookie is set to include at least a user identification of a user of mobile device 624 as well as a message portion which is signed with a digital signature of the user. Mobile device 624 may initiate the cookie setting by submitting a "Set-Cookie" request to the application via an Application Programming Interface (API) for the application. Traditionally, cookies are set in a Web browser in response to receipt of a "Set-Cookie" header string from the server in response to a HTTP request, where the server is the originator of the cookie's name and value (typically a random number). Here, the HTTP cookie used in the present technique is initialized or set by mobile device 624 and not the server.

Next, mobile device 624 produces and sends a message to application server 690 as part of the device's response to the user's initial input request from step 852 (step 854 of FIG. 8B). Mobile device 624 formats the message to include the HTTP cookie in a predetermined field (e.g. header field) of the message.

Application server 690 receives the message from mobile device 624 and processes it. For one, application server 690 may perform validation of the message. For one, application server 690 may test whether the HTTP cookie is included within the predetermined field of the message (step 856 of FIG. 8B). If the HTTP cookie exists as identified by application server 690, then this verification step is successful; otherwise, if no valid token is identified in the predetermined field, the verification step fails.

Further, the application server 690 may determine whether the message portion of the HTTP cookie is signed by the user (step 858 of FIG. 8B). Such a positive verification identifies that the user of mobile device 624 is a valid, existing (human) user. Here, application server 690 attempts to verify the digital signature with a public key corresponding to the user. The public key may be identified from the user's digital certificate which is obtained from certificate authority 612 via the network. If the digital signature is successfully verified by application server 690 with the public key, then this verification step is successful; otherwise the verification step fails. Even further, application server 690 may identify whether an expiry date/time of the cookie has expired. If the expiry date/time has not yet expired, then the verification is successful; otherwise the verification fails.

Again, the actions taken for verification of the digital signature will depend on the protocol or algorithm selected and utilized for its creation. The underlying algorithm may be or be based on DSA, RSA, or other suitable algorithm, such as ECDSA. In one particular example, ECDSA with P521 is utilized for producing and verifying signatures; if ECC technology is not available, RSA 3072 may be utilized.

If all such verifications are successful (e.g. in steps 814, 816), then validation is successful. Application server 690 sends a response message with access to the data or service as requested (step 820 of FIG. 8A), and also operates to perform session management and control with use of the HTTP cookie (step 818 of FIG. 8A). Thus, application server 690 grants mobile device 624 access to the application service via the wireless network if the validation is successful and denies mobile device access 624 to the application service if the validation is unsuccessful.

FIGS. 9-13 are illustrative views of visual data in visual display 222 of the mobile device while it has gained access to and interfacing with the application service of application server 690. As apparent from these views, the communication service may generally involve the sending and receiving of data (e.g. Web or WAP data) for display (e.g. a web page in a browser application) at the mobile device.

In this specific example, application server 690 is providing a purchasing service for purchasing goods and/or services via application server 690. In this example, application server 690 may offer for sale tickets for anticipated events (sports, theatre, shows, etc.) Such data may include the display of data items (e.g. one or more events 902 of FIG. 9 and 1002 of FIG. 10) pertaining to goods and services to be purchased. This purchasing service may or may not involve an e-commerce transaction service for performing an e-commerce transaction via the application server. In one embodiment, application server 690 grants the mobile device access to the e-commerce transaction service if validation/verification is successful; otherwise, application server 690 denies access to the e-commerce transaction service. In this case, receiving of data and information (e.g. goods and/or services to be purchased) may be allowed but the e-commerce transaction service may be disallowed (e.g. where the actual purchasing of the goods and/or services may take place over the telephone). An error message or redirection message may be produced in the display in response.

Figure 11:
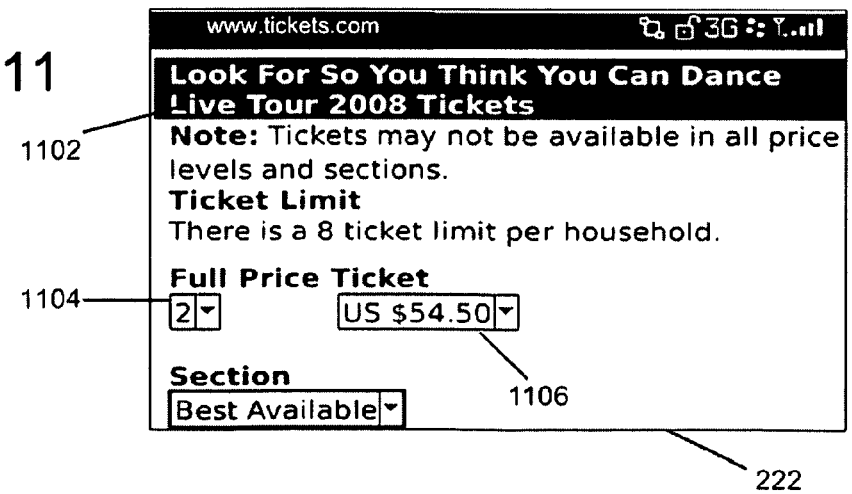

In a purchasing or e-commerce transaction, data or information that is received and displayed may include an identification of the good or service (e.g. an identification 1102 of an event ticket in FIG. 11), a quantity of the good or service (e.g. a quantity 1104 of the event ticket(s) in FIG. 11), and a cost of the good or service (e.g. a cost 1106 of the event ticket(s) in FIG. 11). Also, data or information that is submitted in the e-commerce transaction may include customer payment information 1204 (e.g. credit card information of the user) along with a total cost 1202, an example of which is shown in FIG. 12. Finally, the data or information that is submitted in the e-commerce transaction may include customer address or shipment information 1302, an example of which is shown in FIG. 13.

Note that access or denial to any suitable type of data or service may be provided by application server 690 based on these validation techniques. In this context, for example, certain subscribers or subscribers of the service provider may be entitled to offers for (purchasing of) tickets to attend predetermined events upon successful token validation, but otherwise not be entitled to the offerings for (purchasing of) the tickets. As another example, subscribers of the service provider may be entitled to price discounts off of tickets to attend predetermined events, but otherwise not be entitled to such price discounts.

Figure 14:
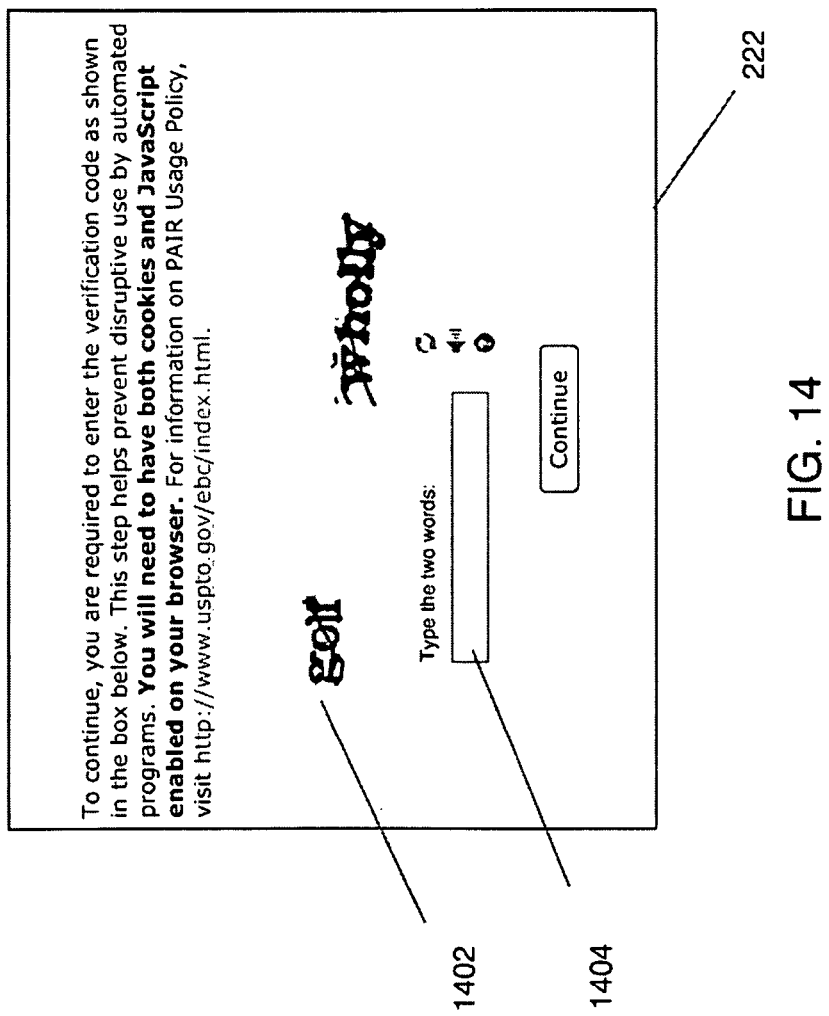
FIG. 14 is an illustrative view of a visual display when a proof-of-work (POW) test, such as a challenge-response test (e.g. a Captcha test), is required by a terminal prior to use of an application service.

In an alternate embodiment, application server 690 may be generally operative to provide display data for producing a proof-of-work (POW) test, such as a challenge-response test, to be executed by terminals prior to their gaining access to the application service (e.g. the e-commerce transaction service). The reason is that application server 690 may be vulnerable to automated software from "bots" or the like, and needs to utilize means to prevent accessibility to the information or service by such automated software. In general, such test involves submitting a question (challenge) to a terminal, receiving an answer (response) from the terminal, and verifying the correctness of the answer (response); the question is difficult to answer unless it is answered by a human or large processing power is utilized. For example, an application server may utilize a challenge-response test such as a Captcha test ("Completely Automatic Public Turing test to tell Computers and Humans Apart"), an example of which is shown in FIG. 14. Such display data may include a distorted visual image 1402 of alphanumeric text and a user input field 1404 for user input of alphanumeric information corresponding to the alphanumeric text.

In accordance with the various embodiments of the present disclosure, however, application server 690 bypasses or excludes such challenge-response test for the mobile device (and refrains from producing display data therefor) if the validation/verification is successful. For example, a request message for purchasing may cause application server 690 to continue the e-commerce transaction if validation/verification is successful, but otherwise cause application server 690 to produce the POW test (e.g. Captcha test) for the terminal to execute.

In a variation of the technique, application server 690 provides an alternative challenge-response test in lieu of the normal challenge-response test if the token validation is successful. The alternative challenge-response test may be a "mobile-friendly" challenge-response test that is suitable for mobile devices (e.g. in contrast to desktop or laptop computers). Thus, more generally, a first POW test is provided if the validation/verification is unsuccessful, but a second POW test which may be suitable for mobile devices is provided if the validation/verification is successful.

In another alternate embodiment, token server 695 may be generally operative to provide display data for producing a POW test, such as a challenge-response test (e.g. Captcha), to be executed by terminals prior to their receipt of a token. If the POW test is passed, the mobile device receives the token from token server 695; otherwise, if the mobile device fails the POW test, it does not receive a valid token from token server 695. This step may be provided in addition to, or alternatively in lieu of, any POW test requirement by the application server.

If additionally provided, it may provide an additional level of verification/security for mobile device access, or alternatively a more selective authorization of only a subset of all mobile devices associated with the service provider. If alternatively provided, this step may provide a shift in the burden of test processing (e.g. Captcha test processing) from the application server to the service provider; this is especially advantageous where there is more than one application server that utilizes the token verification techniques of the present disclosure.

Thus, special access privileges are granted only to particular users or groups of devices (e.g. trusted devices). Convenient accessibility to these application services are given to entrusted devices in a manner that is simple and efficient. Where "group" verification is utilized, the application server need not store and maintain excessive information for each individual subscriber or device associated with a service provider; also, the private key associated with the service provider is, in some embodiments, preferably never passed to the mobile devices, in order to prevent tokens from being replicated by third-parties.

Thus, as described herein, a technique of a communication device adapted for communications using Hypertext Transport Protocol (HTTP) involves setting, at the communication device, an HTTP cookie which includes a user identification of a user of the communication device and a message portion which is signed with a digital signature of the user. The communication device sends, to an application server site via the communication network, a request message which includes the HTTP cookie. If verification of the digital signature at the application server site is successful, the communication device will receive access to an application service of the application server site.

A corresponding technique of an application server site for permitting access to an application service for a communication device over a communication network with use of HTTP involves receiving, from the communication device over the communication network, a request message having an HTTP cookie which includes a user identification and a message portion which is signed with a digital signature. In response, the application server site performs validation of the HTTP cookie, which includes a verification step for verifying the digital signature in the HTTP cookie. If validation of the HTTP cookie is successful, the application server site grants the communication device access to the application service at the application server site via the communication network. Otherwise, if validation of the HTTP cookie is unsuccessful, the application server site denies the communication device access to the application service.

In one variation, the HTTP cookie is set with a group identification of a group with which the user is associated, and the message portion is signed with a digital signature of the group. The group may be a plurality of users associated with a service provider which provides the communication device with access to a communication service in the communication network. In this case, the HTTP cookie may be set with a token retrieved from the service provider, where the token includes the digital signature of the service provider.

The above-described embodiments of the present disclosure are intended to be examples only. For example, although it is described that verifications are performed with respect to specific users or groups, verifications may be performed with respect to the devices themselves (e.g. digital signatures associated with specific devices, servers, or other entities). Those of skill in the art may affect alterations, modifications and variations to the particular embodiments without departing from the scope of the application. The invention described herein in the recited claims intends to cover and embrace all suitable changes in technology.

The invention claimed is:

1. A method for use in a wireless communication device configured to operate in a wireless network utilizing a communication service provided by a service provider, the method comprising:
    storing, at the wireless communication device, a Hypertext Transport Protocol (HTTP) cookie in association with a Web browser application of the wireless communication device, the HTTP cookie including:
        an identification of a user of the wireless communication device; and
        a message portion which is signed with a digital signature of the user of the wireless communication device;
    sending, via the Web browser application, to an application server via the wireless network, an HTTP request message which includes the HTTP cookie; and
    in response to sending the HTTP request message: if verification of the digital signature at the application server is successful, then receiving via the wireless network an HTTP response message and access to an application service of the application server;
    wherein a proof-of-work (POW) test is normally requested for accessing the application service; and
    wherein the POW test is bypassed for the wireless communication device if the verification at the application server is successful.

2. The method of claim 1, further comprising:
    wherein the digital signature is produced with use of a private key corresponding to the user; and
    wherein the verification of the digital signature is performed with use of a public key corresponding to user.

3. The method of claim 1, further comprising:
    failing to receive access, via the wireless network, to the application service if the verification at the application server is unsuccessful.

4. The method of claim 1, wherein receiving access to the application service comprises at least one of:
    receiving, via the wireless network, data for rendering in a display at the communication device;
    receiving, via the wireless network, web data for rendering a web page in the Web browser application of the communication device; or
    receiving the HTTP response message for access, via the wireless network, to an e-commerce transaction service of the application server for performing an e-commerce transaction via the application server.

5. The method of claim 1, further comprising:
    receiving display data for the Web browser application in response to the HTTP request message.

6. The method of claim 1, further comprising:
    accessing the communication service via the wireless network;
    receiving a token from a token server of the service provider; and
    the token being provided in the HTTP cookie of the HTTP request message for verification at the application server.

7. The method of claim 6, wherein accessing the communication service comprises causing authentication credentials of the wireless communication device to be sent via the wireless network for authentication by the service provider.

8. The method of claim 1, wherein the wireless communication device comprises a cellular telephone device operative in a wireless network comprising a cellular telecommunications network.

9. The method of claim 1, wherein the method is performed by computer instructions stored on a non-transitory computer readable medium, the computer instructions being executable by one or more processors of the wireless communication device.

10. A wireless communication device configured to operate in a wireless network with use of a communication service provided by a service provider, the wireless communication device comprising:
one or more processors;
memory coupled to the one or more processors;
a radio frequency (RF) transceiver coupled to the one or more processors and being operative for communications in the wireless network;
the one or more processors being configured to:
set store in the memory a Hypertext Transport Protocol (HTTP) cookie in association with a Web browser application of the wireless communication device, the HTTP cookie including:
an identification of a user of the wireless communication device; and
a message portion which is signed with a digital signature of the user of the wireless communication device;
send, via the Web browser application, to an application server via the wireless network, an HTTP request message which includes the HTTP cookie; and
in response to sending the HTTP request message: if verification of the digital signature at the application server is successful, then receive via the wireless network an HTTP response message and access to an application service of the application server;
wherein a proof-of-work (POW) test is normally requested for accessing the application service; and
wherein the POW test is bypassed for the wireless communication device if the verification at the application server is successful.

11. The wireless communication device of claim 10, further comprising:
wherein the digital signature is produced with use of a private key corresponding to the user; and
wherein the verification of the digital signature is performed with use of a public key corresponding to the user.

12. The wireless communication device of claim 10, wherein the one or more processors are further configured to:
access a token server via the wireless network;
receive, from the token server, a token having the digital signature corresponding to the service provider; and
the token being provided in the HTTP cookie of the HTTP request message for verification at the application server.

13. The wireless communication device of claim 10, wherein the one or more processors are further configured to:
access a communication service via the wireless network;
receive, via the wireless network, a token from a token server of the service provider; and
the token being provided in the HTTP cookie of the HTTP request message for verification at the application server.

14. The wireless communication device of claim 13, wherein gaining access to the communication service comprises causing authentication credentials of the wireless communication device to be sent via the wireless network for authentication by the service provider.

15. The wireless communication device of claim 10, which comprises a cellular telephone device operative in a wireless network comprising a cellular telecommunications network.

16. The wireless communication device of claim 10, further comprising:
wherein the one or more processors are further configured to receive display data for the Web browser application in response to the HTTP request message.

17. A method for use in an application server for permitting access to an application service for a wireless communication device over a wireless network, wherein the wireless communication device is configured to operate in the wireless network with use of a communication service provided by a service provider, the method comprising:
receiving, via the wireless network, from a Web browser application of the wireless communication device, a Hypertext Transport Protocol (HTTP) request message having an HTTP cookie, the HTTP cookie including:
an identification of a user of the wireless communication device ; and
a message portion which is signed with a digital signature of the user of the wireless communication device;
performing validation of the HTTP cookie, which includes a verification step for verifying the digital signature in the HTTP cookie corresponds to the user of the wireless communication device;
if validation of the HTTP cookie is successful, then granting the wireless communication device access to the application service at the application server, sending an HTTP response message to the wireless communication device via the wireless network, and using the HTTP cookie for session management with the Web browser application; and
denying the wireless communication device access to the application service if validation of the HTTP cookie is unsuccessful;
wherein the application server is further configured to provide a proof-of-work (POW) test for accessing the application service, and wherein the act of granting access to the communication service comprises the further act of bypassing the POW test for the wireless communication device if the validation at the application server is successful.

18. The method of claim 17, further comprising:
wherein the digital signature is produced with use of a private key corresponding to the user; and
wherein the verification of the digital signature is performed with use of a public key corresponding to the user.

19. The method of claim 17, wherein the granting of access to the application service comprises at least one of:
sending, via the wireless network, data for rendering in a display at the wireless communication device;
sending, via the wireless network, web data for rendering a web page in the Web browser application of the wireless communication device; or
providing access, via the wireless network, to an e-commerce transaction service of the application server for performing an e-commerce transaction via the application server.

20. The method of claim 17, further comprising:
performing session control and management with use of the HTTP cookie.

21. The method of claim 17, wherein the method is performed by computer instructions stored on a non-transitory computer readable medium, the computer instructions being executable by one or more processors at the application server.

22. An application server configured to permit access to an application service for a wireless communication device via a wireless network, the wireless communication device being configured to operate in the wireless network with use of a communication service provided by a service provider, the application server comprising a processor and memory coupled with the processor; the application server being further configured to:

receive, via the wireless network, from a Web browser application of the wireless communication device, a Hypertext Transport Protocol (HTTP) request message having an HTTP cookie, the HTTP cookie including an identification of a user of the wireless communication device , and a message portion which is signed with a digital signature of the user of the wireless communication device;

perform validation of the HTTP cookie, which includes a verification step for verifying the digital signature in the HTTP cookie corresponds to the user;

if validation of the HTTP cookie is successful:
    grant the wireless communication device access to the application service at the application server,
    send an HTTP response message to the wireless communication device via the wireless network, and using the HTTP cookie for session management with the Web browser application; and deny the wireless communication device access to the application service if validation of the HTTP cookie is unsuccessful;

wherein the application server is further configured to provide a proof-of-work (POW) test for accessing the application service, and wherein the act of granting access to the communication service comprises the further act of bypassing the POW test for the wireless communication device if the validation at the application server is successful.

\* \* \* \* \*